United States Patent Office 3,652,639
Patented Mar. 28, 1972

3,652,639
GRAFT COPOLYMERS OF ACRYLONITRILE ON UNSATURATED POLYOLS
Louis C. Pizzini, Trenton, John G. Demou, Lincoln Park, and John T. Patton, Jr., and William W. Levis, Jr., Wyandotte, Mich., assignors to BASF Wyandotte Corporation, Wyandotte, Mich.
No Drawing. Filed Nov. 20, 1969, Ser. No. 878,594
Int. Cl. C08f 21/00, 25/00
U.S. Cl. 260—465.4
9 Claims

ABSTRACT OF THE DISCLOSURE

Graft copolymers are prepared by the in situ polymerization of acrylonitrile in an unsaturated polyol in the presence of a free radical catalyst. The copolymers are transparent homogeneous liquids which may be employed in the preparation of flexible urethane foams having superior load bearing properties.

---

The present invention relates to liquid, transparent graft copolymers substantially free from the presence of solid polymeric material and to the use thereof in the preparation of polyurethane polymers. More particularly the invention relates to graft copolymers prepared by the in situ polymerization of acrylonitrile in an unsaturated polyol in the presence of a free radical catalyst.

Graft copolymers derived from acrylonitrile and the use thereof in the preparation of polyurethane polymers are well known in the art as evidenced by U.S. 3,383,351 to Stamberger. Although the copolymers of this patent impart improved load-bearing properties to polyurethane foams prepared therefrom, they are not transparent liquids but are, at best, stable dispersions which eventually separate into two phases.

Now, in accordance with the present invention, transparent, homogeneous, liquid graft copolymers are prepared by the in situ polymerization of acrylonitrile in an unsaturated polyol in the presence of a free radical catalyst. In order to obtain the transparent graft copolymers of the present invention it is necessary that grafting occur by the simultaneous addition at a steady rate of acrylonitrile and a free radical catalyst to the unsaturated polyol at a temperature above which the free radical catalyst decomposes. The resulting liquid graft copolymers have a viscosity of less than 50,000 cps. at 25° C., are substantially free from the presence of solid polymeric material and are particularly suitable for use in the preparation of flexible polyurethane foams having improved load-bearing properties.

The unsaturated polyols employed in the present invention may be prepared by the reaction of any conventional polyol with an organic compound having both ethylenic unsaturation and a hydroxyl, carboxyl, or epoxy group or they may be prepared by employing an organic compound having both ethylenic unsaturation and a hydroxyl, carboxyl, or epoxy group as a reactant in the preparation of the polyol. Representative of such organic compounds include unsaturated polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol, unsaturated epoxides such as 1-vinylcyclohexane-3,4-epoxide, butadiene monoxide and 3-allyloxypropylene oxide (allyl glycidylether). If a polycarboxylic acid or anhydride is employed to incorporate unsaturation into the polyols, it is then necessary to react the unsaturated polyol with an alkylene oxide, preferably propylene oxide, to replace the carboxyl groups with hydroxyl groups prior to employment in the present invention. The amount of alkylene oxide employed is such to reduce the acid number of the unsaturated polyol to about one or less. Representative polyols which may be employed in the preparation of the unsaturated polyols employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pats. Nos. 1,922,451, 3,190,927 and 3,346, 557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane, 1,2,6-triol, α-methyl glucoside, pentaerythritol, and sorbitol. Also included with the term "polyhydric alcohol" are compounds derived from phenol such as 2,2-(4,4-hydroxyphenol)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc.

(1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)-propane and blends thereof having equivalene weights of from 250 to 5000.

Suitable polyhydric polythioethers which may be condensed with alkylene oxides include the condensation product of thiodiglycol or the reaction product of a dihydric alcohol such as it disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in co-pending U.S. patent application Ser. No. 728,840 filed May 13, 1968. Preferred polyhydroxyl-containing phosphorus having a $P_2O_5$ equivalency of from about 7% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene; aliphatic amines such as methyl amine, triisopropanol amine, ethylene diamine, 1,3-propylene diamine, 1,4-butylene diamine, and 1,3-butylene diamine.

As mentioned above, in order to introduce the necessary unsaturated groups into the polyols useful as starting materials in the present invention, the organic compound having both ethylenic unsaturation and a hydroxyl, carboxyl, or epoxy group may be included in the polyol-forming reaction mixture or, and preferably, the unsaturation is introduced by reacting a conventional polyol with said organic compound. Generally, from about one mole to about three moles, preferably from 1.5 moles to 2.5 moles, of said organic compound per mole of polyol are employed in the preparation of the polyols employed in the present invention. The preparation of the unsaturated polyols employed in the present invention follows conventional prior art procedures such as disclosed in U.S. 3,275,606 and U.S. 3,280,077. Generally, this requires a catalytic reaction at a temperature between 0° C. and 130° C., preferably from 25° C. to 100° C. Both acidic catalysts, such as Lewis acid catalysts and basic catalysts such as alkali metal hydroxides, may be used.

As mentioned above, the graft copolymers of the invention are prepared by the in situ polymerization of the above-described unsaturated polyols with acrylonitrile. Acrylonitrile may be employed as the sole ethylenically unsaturated monomer or a mixture of acrylonitrile and another ethylenically unsaturated monomer may be employed as long as the mixture contains at least 50% by weight of acrylonitrile. Representative ethylenically unsaturated monomers which may be employed in admixture with acrylonitrile in the present invention include butadiene, isoprene, 1,4-pentadiene, 1,6-hexadiene, 1,7-octadiene, styrene, α-methylstyrene, methylstyrene 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethstyrene, iodostyrene, cyanostyrene, nitrostyrene, N,N-dimethylaminostyrene, acetoxylstyrene, methyl 4 - vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, N, N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro - 1,2-pyran, 2-butoxy-2'-vinyloxy diethyl ether, vinyl 2-ethylmercaptoethyl ether, vinyl methyl ketone, vinyl ethyl ketone, vinyl phosphonates such as bis(β-chloroethyl vinyl puhosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acryate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The amount of ethylenically unsaturated monomer employed in the polymerization reaction is generally from 1% to 30%, preferably from 3% to 20%, based on the weight of the unsaturated polyol. The polymerization occurs by simultaneously adding at a steady or constant rate acrylonitrile and a free radical catalyst to the unasturated polyol at a temperature above which the catalyst decomposes to produce free radicals. This will generally be from 40° C. to 200° C., depending upon the decomposition temperature of the catalyst. It has been determined that liquid, homogeneous, transparent graft copolymers are not obtained if the catalyst is initially added to the polyol and thereafter the acrylonitrile is added. Moreover, liquid transparent graft copolymers are not obtained if acrylonitrile is added to the polyol followed by the addition of the catalyst. As demonstrated hereinafter, only if simultaneous addition of the free radical catalyst and acrylonitrile to the unsaturated polyol occurs will liquid transparent graft copolymers be obtained. Furthermore, it has been determined that liquid, homogeneous, transparent graft copolymers are not obtained unless a constant or steady rate of addition of both streams is maintained. As used herein, the phrase "a constant or steady rate" means that the ratio of the rate of addition of the free radical catalyst and acrylonitrile is maintained essentially constant throughout the addition.

The concentration of the catalyst is also a critical aspect of the present invention and can vary from about 1% to about 10%, preferably from about 2% to about 5% by weight based on the weight of acrylonitrile. It has been determined that the use of amounts of catalyst less than one percent does not provide for liquid transparent copolymers.

Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramethane hydroperoxide, diacetyl peroxide, di-α-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxy-(benzoyl)peroxide, p-monomethoxybenzoyl peroxide, rubrene peroxide, ascaridol, t-butyl peroxybenzoate, diethyl peroxyterphthalate, propyl hydroperoxide, isopropyl hydroperoxide, n-butyl hydroperoxide, t-butyl hydroperoxide, cyclohexyl hydroperoxide, trans-Decalin hydroperoxide, α-methylbenzyl hydroperoxide, α-methyl-α-ethyl benzyl hydroperoxide, Tetralin hydroperoxide, triphenylmethyl hydroperoxide, diphenylmethyl hydroperoxide, α,α' - azo-2-methyl hexane carbonitrile, dimethyl α,α'-azo-isobutyrate, 4,4'-azo-4-cyanopentanoic acid, azobis(isobutyronitrile), persuccinic acid, diisopropyl peroxy dicarbonate, and the like; a mixture of catalysts may also be used. Azobis(isobutyronitrile) is the preferred catalyst.

In a preferred embodiment of the present invention, from 10% to 20% by weight of acrylonitrile based on the weight of the polyol is polymerized in an unsaturated polyol in the presence of from 3% to 5% by weight of azobis(isobutyronitrile) based on the weight of acrylonitrile at a temperature between 110° C. to 140° C. The resulting liquid graft copolymer contains approximately 14% acrylonitrile, has a viscosity of about 15,000 cps. at 25° C. and imparts exceptional load-bearing properties when employed in the preparation of flexible polyurethane foams.

In still another preferred embodiment of the present invention, the foregoing unsaturated polyols are employed in the preparation of polyurethane compositions, particularly polyurethane foams. The resulting polyurethane products exhibit marked improvements in load-bearing properties without substantial impairment of the other physical properties of the products. The polyurethane products are generally prepared by the reaction of the unsaturated polyols with an organic polyisocyanate, optionally in the presence of additional polyhydroxyl-containing components, chain-extending agents, catalysts, surface-active agents, stabilizers, blowing agents, fillers and pigments. Suitable processes for the preparation of cellular polyurethane plastics are disclosed in U.S. Re. Pat. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-hexamethylene-1,6-diisocyanate, tetramethylene-1,4-diisocyanate, cyclohexane-1,4-diisocyanate, hexahydrotolylene diisocyanate (and isomers), naphthylene - 1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the unsaturated polyol is preferably employed along with another polyhydroxyl-containing component commonly employed in the art. Any of the polyhydroxyl-containing components which are described above for use in the preparation of the unsaturated polyols of the present invention may be employed along with the unsaturated polyols in the preparation of the polyurethane compositions of the present invention.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,7,9b-tetraazaphenalene.

Any suitable catalyst may be used including tertiary amines, such as, for example, triethylene diamine, N-methyl morpholine, N-ethyl morpholine, diethyl ethanolamine, N-coco morpholine, 1 - methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane were determined by the following ASTM tests:

| | |
|---|---|
| Tensile strength | D-412 |
| Modulus | D-412 |
| Elongation | D-412 |
| Split tear | D-470 |
| Graves tear | D-624 |
| Hardness | D-2240 |
| Compression set | D-395 |
| Compression load | D-1564 |

EXAMPLE I (A) Preparation of an unsaturated polyether-ester polyol

A stainless steel autoclave equipped with a thermometer, stirrer, nitrogen source, inlet means and heat exchange means was charged with 2506 parts (0.835 mole) of a 3000 molecular weight catalyst-containing polyol prepared by the condensation of propylene oxide with glycerol in the presence of potassium hydroxide (7% by weight based on glycerol). The charge was purged with nitrogen and heated to 100° C. With constant stirring, 102 parts (1.04 moles) of maleic anhydride was then added to the charge maintaining the temperature of the charge at 103° C. At this time, 120 parts (2.08 moles) of propylene oxide was gradually added to the reaction mixture over 1.5 hours. Upon completion of the oxide addition, the reaction mixture was maintained at 103° C. for three hours at which time the reaction mixture was cooled to 30° C. and discharged from the autoclave. The reaction product was treated with an adsorbent, filtered to remove the catalyst and stripped at 100° C. for one hour under less than five millimeters of mercury to remove unreacted propylene oxide. The product, a clear golden yellow liquid, had a hydroxyl number of 52.7, an acid number of 0.5, a refractive index at 25° C. of 1.4536 and a Brookfield viscosity at 25° C. of 100 cps.

(B) Preparation of a transparent graft copolymer

A reaction vessel equipped as described above was charged with 600 parts of the unsaturated polyol prepared in (A) above. Nitrogen was bubbled through the polyol for about on hour. With stirring and under a slight nitrogen flow, the charge was heated to 110° C. and 132 parts of acrylonitrile and a solution of 10 parts of azobis(isobutyronitrile) in 200 parts of toluene was continuously added to the charge over a period of one hour at 110° C. Upon completion of the addition, the reaction mixture was maintained at about 110° C. for one hour. The reaction mixture was then stripped for one hour at 105° C. under less than five millimeters of mercury. The stripped reaction product was a transparent orange homogeneous liquid substantially free from the presence of solid polymeric material having a Brookfield viscosity at 25° C. of 31,200 cps., a hydroxyl number of 45.7 and contained 17.3% by weight of chemically-incorporated acrylonitrile.

The above reaction was carrietd out (1) by adding azobis(isobutyronitrile) to the unsaturated polyol and thereafter adding acrylonitrile to the reaction mixture, (2) by adding acrylonitrile to the unsaturated polyol and thereafter adding azobis(isobutyronitrile), (3) by charging all three ingredients to a vessel and gradually applying heat thereto, and (4) by varying the rate of addition of acrylonitrile to that of azobis(isobutyronitrile). In all cases, the desired homogeneous liquid transparent product was not obtained but heterogeneous opaque dispersions resulted.

EXAMPLE II (A) Preparation of an unsaturated polyether-ester polyol

A stainless steel autoclave equipped with a thermometer, stirrer, nitrogen source, inlet means and heat exchange means was charged with 3007 parts (1.0 mole) of a 3000 molecular weight catalyst-containing polyol prepared by the condensation of propylene oxide with glycerol in the presence of potassium hydroxide (7% by weight based on glycerol). The charge was purged with nitrogen and heated to 105° C. With constant stirring, 147 parts (1.5 moles) of maleic anhydride was then added to the charge maintaining the temperature of the charge at 105° C. At this time, 174 parts (3.0 moles) of propylene oxide was gradually added to the reaction mixture over one and one-half hours. Upon completion of the oxide addition, the reaction mixture was maintained at 105° C. for one hour at which time the reaction mixture was cooled to 30° C. and discharged from the autoclave. The reaction product was treated with an adsorbent, filtered to remove the catalyst and stripped at 105° C. for one hour, under less than five millimeters of mercury to remove unreacted propylene oxide. The product, a clear golden yellow liquid, had a hydroxyl number of 50.3, an acid number of 0.8, a refractive index at 25° C. of 1.4542 and a Brookfield viscosity at 25° C. of 1100 cps.

(B) Preparation of a transparent graft copolymer

A reaction vessel equipped as described above was charged with 250 parts of the unsaturated polyol prepared in (A) above. Nitrogen was bubbled through the polyol for about one-half hour. With stirring and under a slight nitrogen flow, the charge was heated to 125° C. and 38 parts of acrylontrile and a solution of 1.4 parts of azobis(isobutyronitrile) in twenty parts of toluene was continuously added to the charge over a period of ¾ hour at 130° C. Upon completion of the addition, the reaction mixture was maintained at about 130° C. for one hour. The reaction mixture was then stripped for one-half hour at 130° C. under less than ten millimeters of mercury. The stripped reaction product was a transparent amber homogeneous liquid substantially free from the presence of solid polymeric material having a Brookfield viscosity at 25° C. of 5700 cps., a hydroxyl number of 46.3 and contained 11.0% by weight of chemically-incorporated acrylonitrile.

EXAMPLE III (A) Preparation of an unsaturated polyether-ester polyol

A stainless steel autoclave equipped with a thermometer, stirrer, nitrogen source, inlet means and heat exchange means was charged with 3007 parts (1.0 mole) of the polyol described in Example II. The charge was purged with nitrogen and heated to 105° C. With constant stirring, 196 parts (2.0 moles) of maleic anhydride was then added to the charge maintaining the temperature of the charge at 105° C. At this time, 232 parts (4.0 moles) of propylene oxide was gradually added to the reaction mixture over two hours. Upon completion of the oxide addition, the reaction mixture was maintained at 105° C. for one hour at which time the reaction mixture was cooled to 30° C. and discharged from the autoclave. The reaction product was treated with an adsorbent, filtered to remove the catalyst and stripped at 105° C. for one hour under less than five millimeters of mercury to remove unreacted propylene oxide. The product, a clear golden yellow liquid, had a hydroxyl number of 50.3, an acid number of 0.9, a refractive index at 25° C. of 1.4558 and a Brookfield viscosity at 25° C. of 2200 cps.

(B) Preparation of a transparent graft copolymer

A reaction vessel equipped as described above was charged with 500 parts of the unsaturated polyol prepared in (A) above. Nitrogen was bubbled through the polyol for about one hour. With stirring and under a slight nitrogen flow, the charge was heated to 110° C. and 75 parts of acrylonitrile and a solution of 2.8 parts of azobis(isobutyronitrile) in 79 parts of toluene was continuously added to the charge over a period of one hour at 110° C. Upon completion of the addition, the reaction mixture was maintained at about 110° C. for one hour. The reaction mixture was then stripped at 110° C. under less than ten millimeters of mercury. The stripped reaction product was a transparent orange homogeneous liquid substantially free from the presence of solid polymeric material having a Brookfield viscosity at 25° C. of 18,600 cps., a hydroxyl number of 44.1 and contained 11.5% by weight of chemically-incorporated acrylonitrile.

EXAMPLE IV (A) Preparation of an unsaturated polyether-ester polyol

A stainless steel steel autoclave equipped with a thermometer, stirrer, nitrogen source, inlet means and heat exchange means was charged with 3007 parts (1.0 mole) of the polyol described in Example II. The charge was purged with nitrogen and heated to 105° C. With constant stirring, 294 parts (3.0 moles) of maleic anhydride was then added to the charge maintaining the temperature of the charge at 105° C. At this time, 348 parts (6.0 moles) of propylene oxide was gradually added to the reaction mixture over three hours. Upon completion of the oxide addition, the reaction mixture was maintained at 105° C. for three hours at which time the reaction mixture was cooled to 30° C. and discharged from the autoclave. The reaction product was treated with an adsorbent, filtered to remove the catalyst and stripped at 105° C. for one hour under less than five millimeters of mercury to remove unreacted propylene oxide. The product, a clear golden yellow liquid, had a hydroxyl number of 49.6, an acid number of 0.5, a refractive index at 25° C. of 1.4577 and a Brookfield viscosity at 25° C. of 3460 cps.

(B) Preparation of a transparent graft copolymer

A reaction vessel equipped as described above was charged with 500 parts of the unsaturated polyol prepared in (A) above. Nitrogen was bubbled through the polyol for about one hour. With stirring and under a slight nitrogen flow, the charge was heated to 130° C. and 75 parts of acrylonitrile and a solution of 1.9 parts of azobis(isobutyronitrile) in 79 parts of toluene was continuously added to the charge over a period of one hour at 130° C. Upon completion of the addition, the reaction mixture was maintained at about 130° C. for one hour. The reaction mixture was then stripped for one hour at 110° C. under less than five millimeters of mercury. The stripped reaction product was a transparent amber homogeneous liquid substantially free from the presence of solid polymeric material having a Brookfield viscosity at 25° C. of 46,000 cps., a hydroxyl number of 45.9 and contained 12.1% by weight of chemically-incorporated acrylonitrile.

EXAMPLE V (A) Preparation of an unsaturated polyether-ester polyol

A stainless steel autoclave equipped with a thermometer, stirrer, nitrogen source, inlet means and heat exchange means was charged with 5009 parts (1.6 moles) of the 3000 molecular weight polyol described in Example II. The charge was purged with nitrogen and heated to 103° C. With constant stirring, 245 parts (2.5 moles) of maleic anhydride was then added to the charge maintaining the temperature of the charge at 103° C. for fifteen minutes. Then, 290 parts (5.0 moles) of propylene oxide was gradually added to the reaction mixture over 2.5 hours. Upon completion of the oxide addition, the reaction mixture was maintained at 103° C. for 2.5 hours at which time the reaction mixture was cooled to 30° C. and discharged from the autoclave. The reaction product was treated with an adsorbent, filtered to remove the catalyst and stripped at 100° C. for one hour under less than ten millimeters of mercury to remove unreacted propylene oxide. The product, a clear golden yellow liquid, had a hydroxyl number of 52.2, an acid number of 0.6, a refractive index at 25° C. of 1.4544 and a Brookfield viscosity at 25° C. of 1200 cps.

(B) Preparation of a transparent graft copolymer

A reaction vessel equipped as described above was charged with 750 parts of the unsaturated polyol prepared in (A) above. Nitrogen was bubbled through the polyol for about 0.5 hour. With stirring and under a slight nitrogen flow, the charge was heated to 130° C. and 223 parts of acrylonitrile and a suspension of 8.2 parts of azobis(isobutyronitrile) in 500 parts of the unsaturated polyol prepared in (A) above was continuously added to the charge over a period of two hours at 130° C. for the acrylonitrile stream and for a period of 2.1 hours for the other stream. Upon completion of the addition, the reaction mixture was maintained at about 130° C. for one hour. The reaction mixture was then stripped for one hour at 125° C. under less than ten millimeters of mercury. The stripped reaction product was a transparent orange homogeneous liquid substantially free from the presence of solid polymeric material having a Brookfield viscosity at 25° C. of 16,000 cps., a hydroxyl number of 45.0 and contained 14.0% by weight of chemically-incorporated acrylonitrile.

EXAMPLE VI (A) Preparation of an unsaturated polyether-ester polyol

A stainless steel autoclave equipped with a thermometer, stirrer, nitrogen source, inlet means and heat exchange means was charged with 5009 parts (1.6 moles) of the 3000 molecular weight polyol described in Example II. The charge was purged with nitrogen and heated to 103° C. With constant stirring, 245 parts (2.5 moles) of maleic anhydride was then added to the charge maintaining the temperature of the charge at 103° C. for fifteen minutes. At this time, 290 parts (5.0 moles) of propylene oxide was gradually added to the reaction mixture over 2.5 hours. Upon completion of the oxide addition, the reaction mixture was maintained at 103° C. for 2.5 hours at which time the reaction mixture was cooled to 30° C. and discharged from the autoclave. The reaction product was treated with an adsorbent, filtered to remove the catalyst and stripped at 100° C. for one hour under less than ten millimeters of mercury to remove unreacted propylene oxide. The product, a clear golden yellow liquid, had a hydroxyl number of 52.2, an acid number of 0.6, a refractive index at 25° C. of 1.4544 and a Brookfield viscosity at 25° C. of 1200 cps.

(B) Preparation of a transparent graft copolymer

A reaction vessel equipped as described above was charged with 630.6 parts of the unsaturated polyol prepared in (A) above. Nitrogen was bubbled through the polyol for about 0.5 hour. With stirring and under a slight nitrogen flow, the charge was heated to 180° C. and 106 parts of acrylonitrile and a solution of 4.0 parts of di-tertiarylbutyl peroxide in 422.5 parts of the unsaturated polyol prepared in (A) above was continuously added to the charge over a period of sixteen hours at 170° C. to 180° C. Upon completion of the addition, the reaction mixture was maintained at about 180° C. to 190° C. for two hours. The reaction mixture was then stripped for one hour at 170° C. under less than ten millimeters of mercury. The stripped reaction product was a transparent orange homogeneous liquid substantially free from the presence of solid polymeric material having a Brookfield viscosity at 25° C. of 28,400 cps., a hydroxyl number of 49.0 and contained 5.8% by weight of chemically-incorporated acrylonitrile.

EXAMPLE VII (A) Preparation of an unsaturated polyether polyol

A stainless steel autoclave equipped with a thermometer, stirrer, nitrogen source, inlet means and heat exchange means was charged with 3.0 parts of boron trifluoride diethyl ether and 1603 parts (0.534 mole) of the 3000 molecular weight polyol described in Example II. The charge was purged with nitrogen and heated to 50° C. With constant stirring, 91 parts (0.8 mole) of allyl glycidyl ether was then added to the charge maintaining the temperature of the charge at 50° C. Upon completion of the ether addition, the reaction mixture was maintained at 50° C. for 2.25 hours at which time the reaction mixture was cooled to 25° C. and discharged from the autoclave. The reaction product was washed with dilute aqueous ammonium hydroxide, treated with an adsorbent, filtered to remove the catalyst, and stripped at 50° C. for one hour under less than ten millimeters of mercury to remove unreacted oxide. The product, a clear golden yellow liquid, had a hydroxyl number of 55.0, an acid number of 0.1, a refractive index at 25° C. of 1.4524 and a Brookfield viscosity at 25° C. of 720 cps.

(B) Preparation of a transparent graft copolymer

A reaction vessel equipped as described above was charged with 300 parts of the unsaturated polyol prepared in (A) above. Nitrogen was bubbled through the polyol for about 0.5 hour. With stirring and under a slight nitrogen flow, the charge was heated to 130° C. and 60 parts of acrylonitrile and a suspension of 3.3 parts of azobis(isobutyronitrile) in 200 parts of the unsaturated polyol prepared in (A) was continuously added to the charge over a period of one hour at 130° C. Upon completion of the addition, the reaction mixture was maintained at about 130° C. for one hour. The reaction mixture was then stripped for one hour at 120° C. under less than ten millimeters of mercury. The stripped reaction product was a transparent orange homogeneous liquid substantially free from the presence of solid polymeric material having a Brookfield viscosity at 25° C. of 17,400 cps., a hydroxyl number of 49.6 and contained 9.4% by weight of chemically-incorporated acrylonitrile.

EXAMPLE VIII (A) Preparation of an unsaturated polyether-ester polyol

A stainless steel autoclave equipped with a thermometer, stirrer, nitrogen source, inlet means and heat exchange means was charged with 3900 parts (3.0 moles) of Pluracol P1300, a 1300 molecular weight polyol prepared by the condensation of propylene oxide with propylene glycol. The charge was purged with nitrogen and heated to 160° C. With constant stirring 392 parts (4.0 moles) of maleic anhydride was then added to the charge maintaining the temperature of the charge at 160° C. At this time, 464 parts (8.0 moles) of propylene oxide was gradually added to the reaction mixture over four hours. Upon completion of the oxide addition, the reaction mixture was maintained at 160° C. for nine hours at which time the reaction mixture was cooled to 35° C. and discharged from the autoclave. The reaction product was stripped at 110° C. for one hour under less than ten millimeters of mercury to remove unreacted propylene oxide. The product, a clear golden yellow liquid, had a hydroxyl number of 73.7, an acid number of 2.8, a refractive index at 25° C. of 1.4559 and a Brookfield viscosity at 25° C. of 980 cps.

(B) Preparation of a transparent graft copolymer

A reaction vessel equipped as described above was charged with 1000 parts of the unsaturated polyol prepared in (A) above. Nitrogen was bubbled through the polyol for about 0.5 hour. With stirring and under a slight nitrogen flow, the charge was heated to 130° C. and 234 parts of acrylonitrile and a solution of 8.7 parts of azobis(isobutyronitrile) in 500 parts of the unsaturated polyol prepared in (A) above were continuously added to the charge over a period of two hours at 130° C. Upon completion of the addition, the reaction mixture was maintained at about 130° C. for one hour. The reaction mixture was then stripped for one hour at 125° C. under less than ten millimeters of mercury. The stripped reaction product was a transparent orange homogeneous liquid substantially free from the presence of solid polymeric material having a Brookfield viscosity at 25° C. of 9200 cps., a hydroxyl number of 63.9 and contained 11.3% by weight of chemically-incorporated acrylonitrile.

A polyurethane elastomer was prepared employing the above polyol as one ingredient thereof (34.4 parts). Other ingredients employed included tolylene diisocyanate (23.8 parts), a 700 molecular weight polypropylene glycol (31.0 parts), a 1500 molecular weight polyol obtained by condensing trimethylolpropane with propylene oxide (10.7 parts), and methylene bis o-chloroaniline (17.8 parts). The elastomer was prepared employing standard prepolymer techniques. In addition to improvements in water resistance, the elastomer exhibited the following physical properties:

| | |
|---|---|
| Tensile strength, p.s.i. | 3970 |
| 300% modulus, p.s.i. | 3720 |
| 100% modulus, p.s.i. | 1900 |
| Elongation, percent | 310 |
| Elongation set, percent | 20 |
| Split tear, p.i. | 78.4 |
| Graves tear, p.i. | 358 |
| Shore A hardness | 94–92 |
| Shore D hardness | 51–45 |
| Compression set, percent | 62.1 |
| Bashore resilience, percent | 29 |
| NBS abrasion | 490 |

EXAMPLE IX

Polyurethane foam compositions were prepared employing the graft copolymers of the present invention as one of the reactants. In addition to the unsaturated polyol, the other ingredients employed and amounts thereof include:

| Ingredient: | Parts |
|---|---|
| Graft copolymer | 33.0 |
| Pluracol GP3030 | 67.0 |
| Water | 3.0 |
| Silicone DC-190 | 1.5 |
| Triethylenediamine | 0.1 |
| Stannous octoate | 0.1–0.3 |
| Tolylene diisocyanate (80/20 2,4-2,6-isomer mixture 1.05 index) | 39–40 |

The foams were cured for about one hour at 120° C. All formulations demonstrated a good rise and the resulting foams were open celled. Physical properties of the foams are presented in Table I below. In each case, as control a polyurethane foam was prepared from Pluracol GP3030 as the sole polyol reactant. The foams prepared employing the graft copolymers of the present invention exhibited a marked increase in load-bearing properties, as determined by Compression Load values as compared to foams having the same density but prepared from the conventional polyol. The physical properties presented in Table I were determined by ASTM D–1564–64T.

TABLE I.—FOAM PROPERTIES

| Foam prepared from graft copolymer of example | I | II | V | VI | VII |
|---|---|---|---|---|---|
| Density (core), pcf | 2.20 | 1.91 | 1.86 | 1.77 | 1.87 |
| Tensile strength, p.s.i. | 26.9 | 21.0 | 20.5 | 15.3 | 14.9 |
| Elongation, percent | 157.0 | 206.0 | 217.0 | 177.0 | 157.0 |
| Tear resistance, p.s.i. | 2.9 | 2.8 | 2.7 | 1.7 | 1.9 |
| Compression set: | | | | | |
| 50% deflection | 10.1 | 5.5 | 5.7 | 10.2 | 8.0 |
| 90% deflection | 9.3 | 6.3 | 6.3 | 9.7 | 7.7 |
| Compression load, p.s.i.: | | | | | |
| 25% deflection, w. rest | 0.47 | 0.60 | 0.52 | 0.41 | 0.51 |
| 65% deflection, w. rest | 0.81 | 0.91 | 0.90 | 0.71 | 0.92 |

What is claimed is:

1. A process for the preparation of liquid, transparent graft copolymers which comprises simultaneously adding, at a steady rate, to an unsaturated polyol obtained by reacting an organic compound having both ethylenic unsaturation and a hydroxyl, carboxyl, or epoxy group with a polyol in a mole ratio of said organic compound to polyol of from about 1:1 to 3:1, from 1% to 30% by weight based on the weight of the unsaturated polyol of acrylonitrile and from 1% to 10% by weight based on the weight of acrylonitrile of a free radical catalyst, said addition occurring at a temperature above which the free radical catalyst decomposes.

2. The process of claim 1 wherein the polyol is a polyalkylene polyether polyol.

3. The process of claim 1 wherein said organic compound is maleic anhydride or allyl glycidyl ether.

4. The process of claim 1 wherein the catalyst is azobis (isobutyronitrile).

5. The process of claim 4 wherein the addition occurs at a temperature between about 110° C. to 140° C.

6. The process of claim 1 wherein the unsaturated polyol is prepared by the reaction of maleic anhydride with a polyalkylene polyether polyol in a mole ratio of anhydride to polyol of from 1.5:1 to 2.5:1, the free radical catalyst is azobis(isobutyronitrile) and the temperature of the addition is between 110° C. and 140° C.

7. A liquid transparent graft copolymer prepared in accordance with the process of claim 1.

8. The copolymer of claim 7 wherein the unsaturated polyol is prepared by the reaction of an organic compound with a polyalkylene polyether polyol in a mole ratio of said organic compound to polyol of from about 1.5:1 to 2.5:1.

9. The copolymer of claim 1 wherein the unsaturated polyol is prepared by the reaction of maleic anhydride with a polyalkylene polyether polyol in a mole ratio of maleic anhydride to polyol of from 1.5:1 to 2.5:1, the free radical catalyst is azobis(isobutylronitrile) and the temperature of the addition is between 110° C. and 140° C.

References Cited
UNITED STATES PATENTS

| | | | |
|---|---|---|---|
| 3,254,060 | 5/1966 | Connolly et al. | 260—78.4 |
| 3,257,477 | 6/1966 | Hedrick | 260—872 |
| 3,375,301 | 3/1968 | Case et al. | 260—869 |
| 3,385,913 | 5/1968 | Skrypa | 260—898 |
| 3,405,162 | 10/1968 | Kuryla | 260—465.6 |
| 3,483,169 | 12/1969 | Case et al. | 260—78.4 |
| 3,524,902 | 10/1970 | Feltzin et al. | 260—835 |

OTHER REFERENCES

Boenig: "Unsaturated Polyesters," p. 166, Elsevier 1964.

WILLIAM H. SHORT, Primary Examiner

E. A. NIELSEN, Assistant Examiner

U.S. Cl. X.R.

260—2.5 AZ, 2.5 AG, 75 NM, 75 NN, 465.6, 857, 870, 874, 928